United States Patent [19]

Rimmele

[11] 4,256,580
[45] Mar. 17, 1981

[54] WASTE WATER PURIFYING PLANT

[75] Inventor: Karl Rimmele, Schmerikon, Switzerland

[73] Assignee: Mecafina S.A., Switzerland

[21] Appl. No.: 48,825

[22] Filed: Jun. 15, 1979

Related U.S. Application Data

[63] Continuation of Ser. No. 839,498, Oct. 5, 1977, abandoned.

[30] Foreign Application Priority Data

Oct. 8, 1976 [CH] Switzerland ............ 12774/76

[51] Int. Cl.³ ............................................ B01D 21/18
[52] U.S. Cl. ........................................ 210/151; 261/92
[58] Field of Search ............... 210/17, 150, 151, 161, 210/402, 403, 404, 153; 261/92; 308/22, 203, 204; 29/110, 111, 112, 113, 114, 115, 116

[56] References Cited

U.S. PATENT DOCUMENTS

| 1,164,799 | 12/1915 | Fesermaier | 302/22 |
|---|---|---|---|
| 2,388,503 | 11/1945 | Steinle et al. | 308/22 |
| 2,513,643 | 7/1950 | Griner | 308/22 |
| 3,188,155 | 6/1965 | Kemnitz | 308/204 |
| 3,565,001 | 2/1971 | Zimmer | 29/115 |
| 3,613,890 | 10/1971 | Hellquist | 210/150 |
| 3,688,905 | 9/1972 | Norford | 210/151 |

FOREIGN PATENT DOCUMENTS

| 1275967 | 8/1968 | Fed. Rep. of Germany. | |
|---|---|---|---|
| 1300958 | 8/1969 | Fed. Rep. of Germany. | |
| 1592579 | 1/1971 | Fed. Rep. of Germany. | |
| 2340584 | 10/1973 | Fed. Rep. of Germany. | |
| 1956728 | 2/1974 | Fed. Rep. of Germany. | |
| 2337518 | 2/1975 | Fed. Rep. of Germany | 210/151 |
| 130090 | 1/1929 | Switzerland | 308/180 |
| 441140 | 1/1968 | Switzerland | 210/150 |
| 537340 | 7/1973 | Switzerland | 210/50 |
| 10613 | of 1890 | United Kingdom | 308/203 |
| 5640 | of 1910 | United Kingdom | 308/203 |
| 383657 | 11/1932 | United Kingdom | 308/203 |
| 390100 | 3/1936 | United Kingdom | 308/203 |

Primary Examiner—Theodore A. Granger
Attorney, Agent, or Firm—Hubbell, Cohen, Stiefel & Gross

[57] ABSTRACT

The invention relates to a mechanico-biological waste water purifying plant. The plant has a trough and at least one partially immersible rotatable body arranged therein, the body having a stack of discs which are partially immersed in waste water in the trough and a shaft projecting at its end beyond the stack of discs. The ends of the shaft are supported rotatably in the bearings which have at least two bearing rollers upon which the ends of the shaft are positioned so as to be liftable upwards freely therefrom.

27 Claims, 9 Drawing Figures

WASTE WATER PURIFYING PLANT

This is a continuation of application Ser. No. 839,498, filed Oct. 5, 1977 now abandoned.

The invention refers to a mechanico-biological waste water purifying plant having a trough and at least one partly immersed rotatable body arranged therein and having a stack of discs which are partially immersed in the waste water. A shaft projecting at the ends beyond the stack of discs supports the body rotatably in bearings. Mechanico-biological waste water purifying plants of this kind are well known.

In one such known purifying plant (see Swiss Patent No. 441,140) the partially immersed body is arranged in fixed bearings in the trough. For maintenance and repair work it is necessary to dismantle at least the bearings and partially strip the body too. Maintenance and repair work thereby becomes not only timewasting but as a result costly.

From Swiss Patent No. 537,340 a mechanico-biological waste water purifying plant is known in which the rotatable body consists of a stack of discs where the discs run in a helix. The individual helical surfaces are formed of discs in the shape of sectors of a circle overlapping one another, which are arranged in a guide-groove running helically in the hub. The discs of adjacent helical surfaces are kept apart by means of spacer-members. The helical surfaces are further braced together by means of a number of strain members arranged parallel with the hub. This body likewise has a shaft projecting at the ends beyond the stack of discs, by means of which the body can be supported rotatably in bearings. With this body too no precautions are taken to bring about simple supporting of the shaft. The shafts must be arranged in closed bearings. This leads not only to complicated mounting of the body as, for maintenance and repair work, troublesome and costly work of dismantling is likewise necessary. This kind of support of the body also does not allow a number of bodies to be coupled together simply.

The body of the known purifying plant is moreover constructed in a rather complicated way since it needs, for guidance of the discs, hubs which are provided with guide-grooves running helically. With this form of body close limits are set to its diameter for reasons of rigidity.

According to the invention a mechanico-biological waste water purifying plant has a trough and at least one partially immersable rotatable body arranged therein, the body having a stack of discs which are partially immersed in waste water in the trough, and a shaft projecting at its ends beyond the stack of discs and supported rotatably in bearings, each of which has at least two bearing rollers upon which the ends of the shaft are positioned to be liftable upwards freely.

Because each of the bearings exhibits at least two bearings rollers upon which the ends of the shaft rest so that they can freely be lifted upwards, not only is mounting of the body made considerably easier but also its dismounting for maintenance and repair work. This construction also enables the bearings to be constructed so that the adjacent ends of two bodies or of one body and an auxiliary unit can be supported on one bearing and coupled together at that point too. This confers the advantage that such bodies may be manufactured in standardized sizes and, depending upon the necessary capacity of a purifying plant, can be combined in any required number with other bodies.

One example of a plant according to the invention will now be described in greater detail below with reference to the accompanying drawings, in which.

Figure 2:
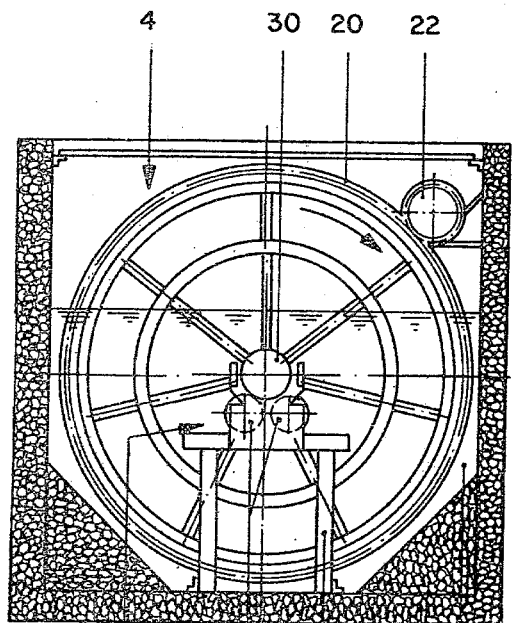
FIG. 2 shows the purifying plant of FIG. 1 in section along II—II in FIG. 1.
Figure 1:
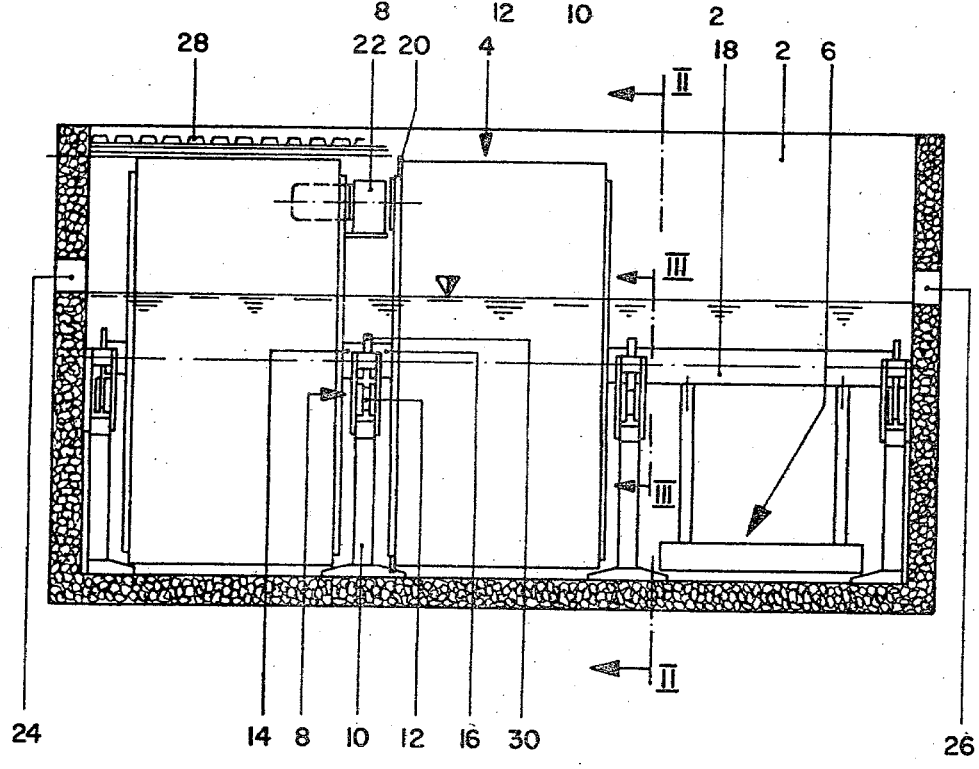
FIG. 1 shows a mechanico-biological waste water purifying plant in side elevation and with the sidewall cut away.

FIGS. 1 and 2 show a mechanico-biological waste water purifying plant which has a trough 2 in which two partially immersible rotatable bodies 4 and a paddle 6 are supported rotatably in bearings 8. The bearings 8, arranged on bearing pedestals 10, each have two bearing rollers 12 upon which the ends 14 and 16 of the shafts 18 of the body 4 and of the paddle 6 rest, so that they can be lifted upwards freely. The bearings 8 are further so constructed that adjacent shaft ends 14, 16 which are coupled together rest on a common bearing 8 as is described in further detail below. One of the bodies 4 carries a gear rim 20 with which engages a driving motor 22. The waste water to be purified flows via an inlet 24 into the trough. The biologically pure waste water flows away via a discharge 26. A duckboard 28 serves to cover over the trough.

As shown in FIG. 1 the purifying plant contains two bodies 4 constructed to a standard size, and a paddle 6. The paddle acts on the one hand as a filler body for keeping free a spare space for a further dip-drip body in the event that the capacity of the purifying plant has to be increased and the other hand, by its revolving action, it prolongs the residence time of the waste water in the trough and hence increases the purifying action. Apart from this the paddle prevents precipitation of the sludge.

The paddle could alternatively be arranged between two bodies, thereby subdividing the purifying plant into two stages between which a prolonged pause is caused by the paddle. Hence with uniform components purifying plants of any desired size and kind can be produced, and in particular the possibility is also provided of subsequent expansion of the purifying plant.

Figure 5:
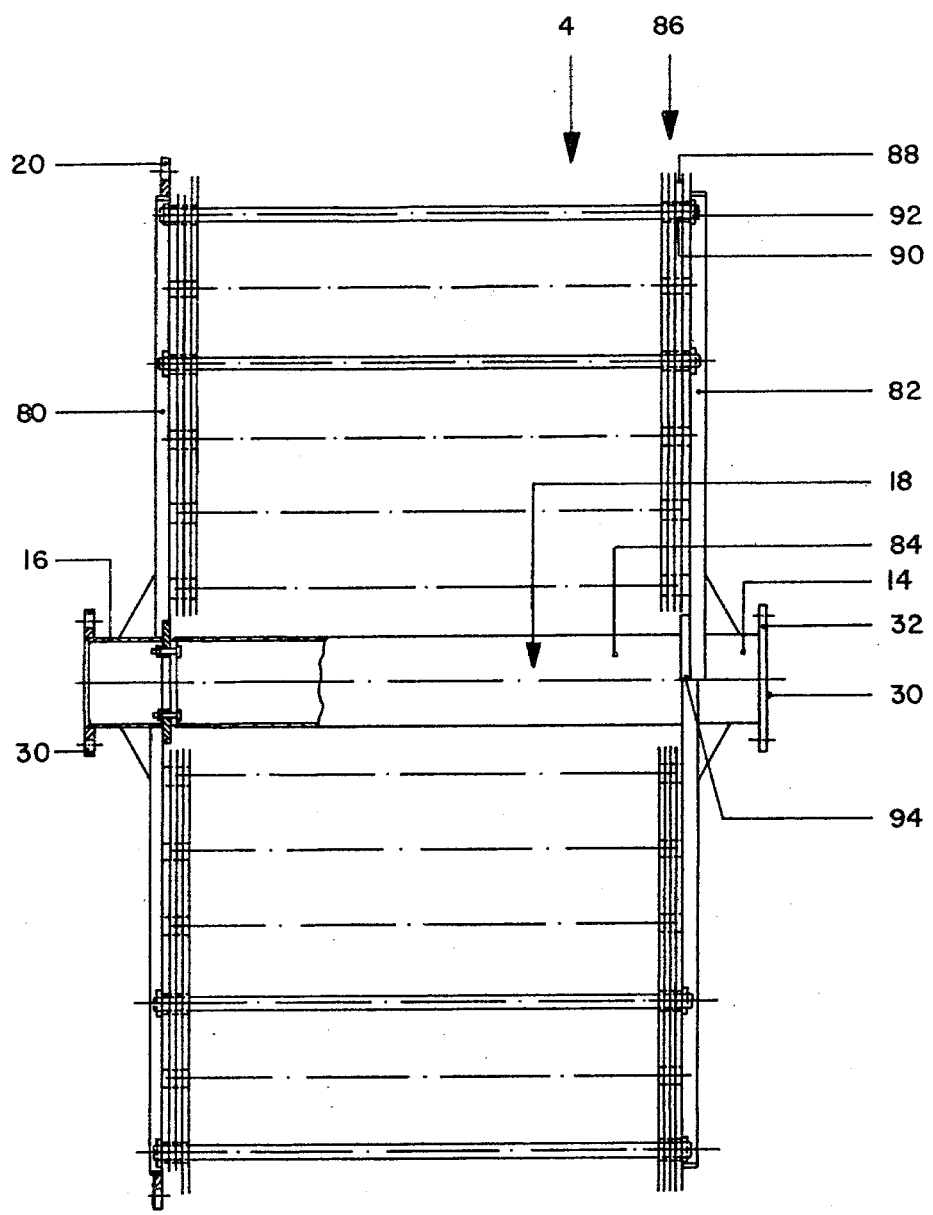
FIG. 5 shows a rotatable body of the purifying plant of FIG. 1, partially sectioned and on a larger scale.
Figure 6:
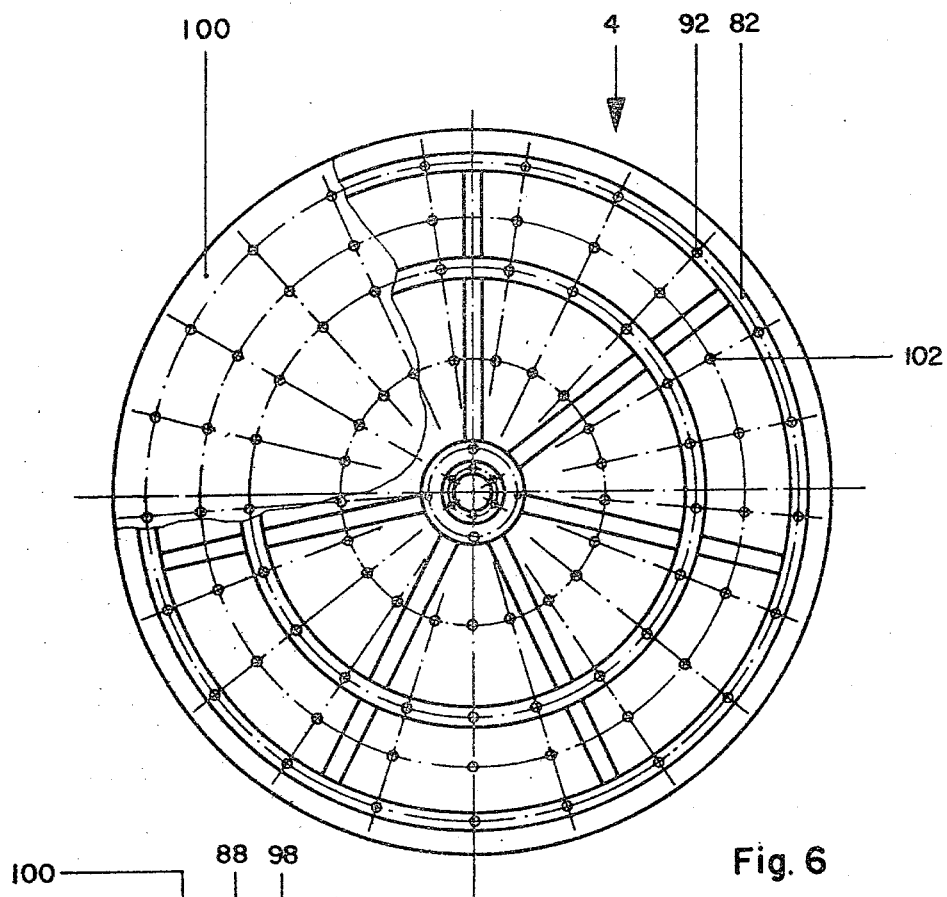
FIG. 6 shows the rotatable body of FIG. 5 in elevation one one end face component on a smaller scale.
Figure 7:
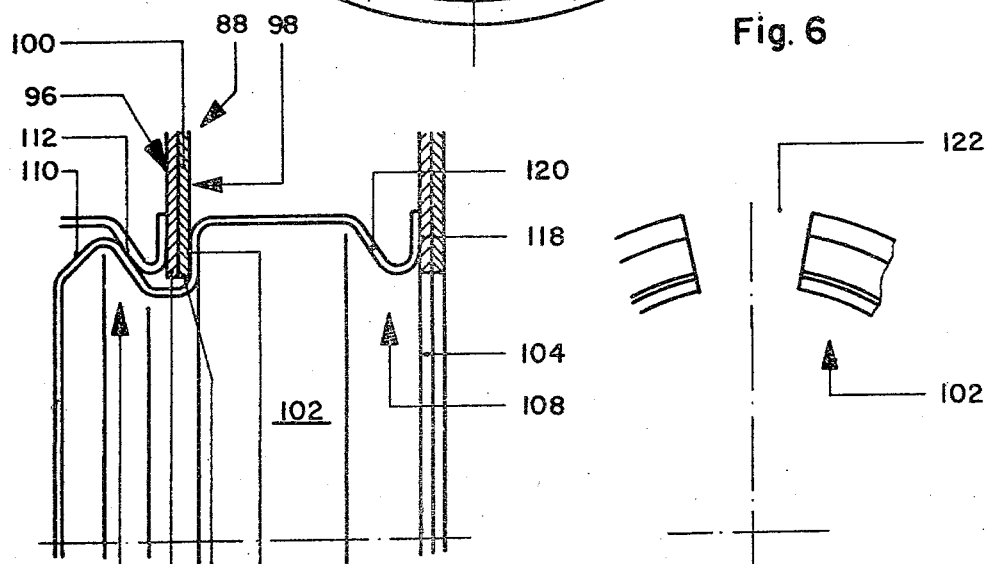
FIG. 7 shows a plug-in-together spacer-member for connection and spacing of two discs of the rotatable body in section and on a larger scale.
Figure 8:
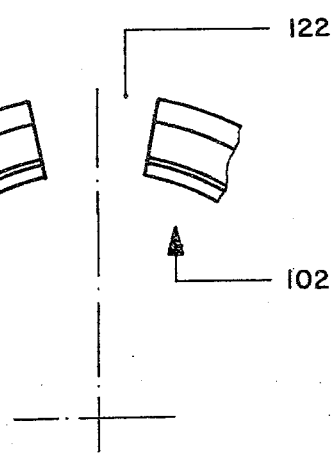
FIG. 8 shows the spacer-member of FIG. 7 in section and in elevation on the plug-in part; and, FIG. 9 shows a portion of a rotatable body with the stack or discs in parallel.
Figure 9:
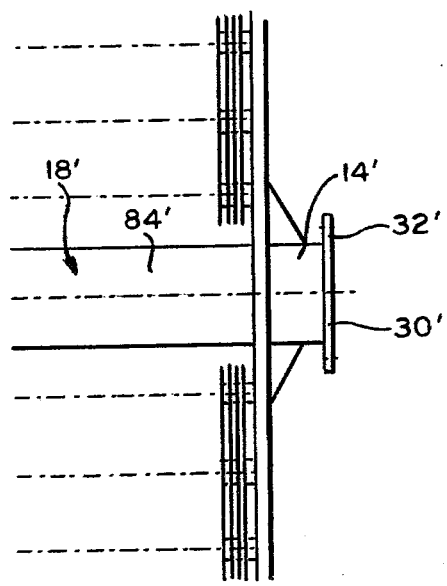

In the embodiment shown the discs of a stack of discs of the body 4 are not parallel with one another but are connected together into a helical surface as is further explained in greater detail in particular with the aid of FIG. 5. Correspondingly the flow through the bodies and hence the purifying plant is in the axial direction. It is however also possible to arrange the discs of the stack of discs in parallel and to pass the flow through the bodies and the purifying plant transversely to the axis of the bodies. Such a construction is shown in FIG. 9.

Figure 3:
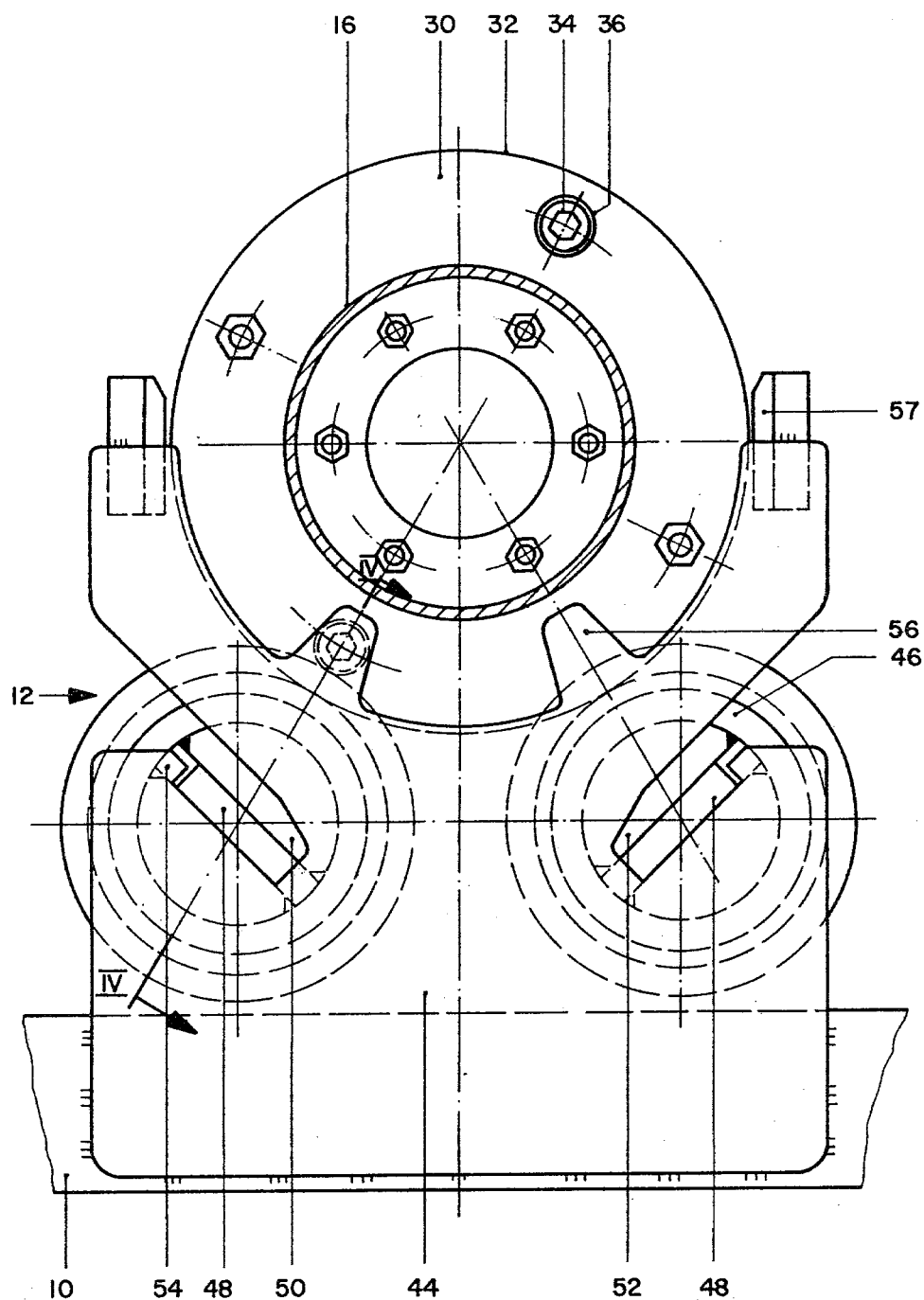
FIG. 3 shows a bearing of the purifying plant in section along III—III in FIG. 1, on a larger scale.
Figure 4:
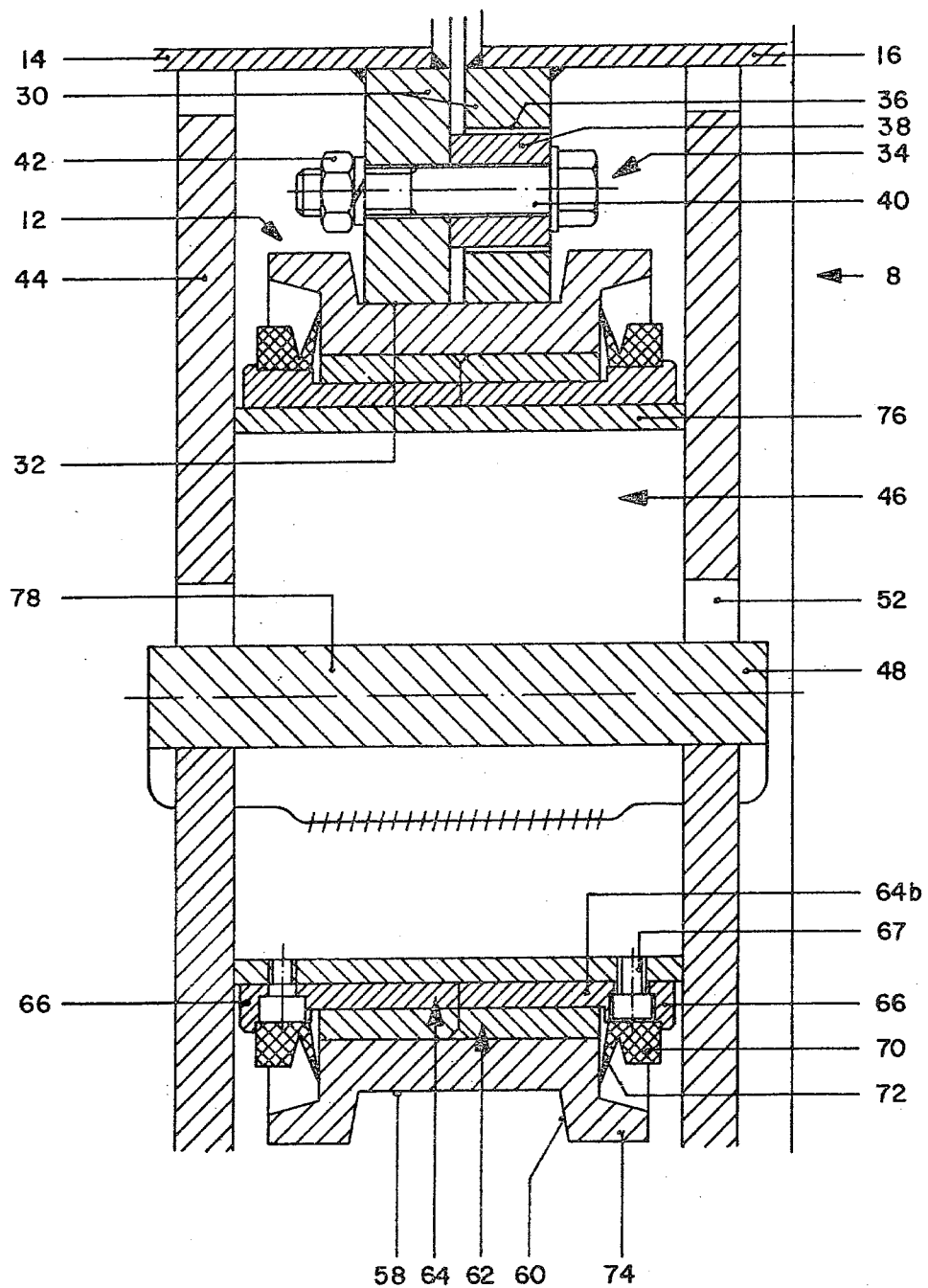
FIG. 4 shows the bearing of FIG. 3 in section along IV—IV in FIG. 3, on a larger scale.

FIGS. 3 and 4 show details of construction of the bearings 8 and shaft ends 14, 16 of the bodies 4 and the paddle 6 respectively. The shaft ends exhibit radially projecting shaft flanges 30 the peripheral surface 32 of which serves as bearing surface for the bearing rollers 12. The shaft flanges 30 contain two driving-pins 34 lying diametrically opposite one another and, offset by 90°, two driving-openings 36 also lying diametrically opposite one another. The driving pins consist of a bush 38 which is bolted to the shaft flange 30 by means of a bolt 40 and a nut 42. The shaft flanges 30 of adjacent shaft ends 14, 16 may in this way be coupled together.

The bearing 8, arranged on a bearing pedestal 10, includes a forklike bearing housing 44 open at the top for receiving one or two shaft ends 14, 16 so that these may be introduced from above into the bearing. The bearing rollers 12 are supported on shafts 46 the outer parts 48 of which are introduced into slots 50, 52 in the bearing housing 44 and secured against slipping out by means of stops 54. These slots 50 and 52 for the two bearing rollers 12 of one bearing point obliquely upwards and away from one another. Preferably the slots slope at an angle of approximately 45° to the horizontal. The outer parts 48 of the shaft 46 are preferably made flat and exhibit a rectangular cross-section. This enables a broad bearing surface for the outer parts 48 in the slots 50 and 52 and a simple form of the stops 54 projecting into the slots 50 and 52. The slots 50 and 52 in the region of the stops 54 are kept wide enough for the outer parts 48 after lifting over the stops 54 to be able to be slid in and out of the slots. The bearing housing 44 exhibits in the region of the bearing rollers 12 supporting ears 56 which are used for supporting the shaft ends 14, 16 when the bearing rollers 12 are removed or worn out. Again, guides 57, arranged opposite one another at axis height on the bearing housing 44, cooperate with the shaft flanges 30, facilitate their introduction into the bearings and oppose any possible jumping out of the shaft flanges out of the bearing rollers.

The bearing rollers 12 have each a peripheral groove 58 for receiving a shaft flange or two adjacent like shaft flanges 30. The peripheral groove guarantees maintenance of the shaft flanges 30 in their axial positions. The sidefaces 60 of the peripheral groove 58 are preferably bevelled in order to facilitate introduction of the shaft flanges.

The bearing rollers 12 are preferably annular and exhibit on the inside of them a bearing bush 62 which slides on a bearing ring 64 on the shaft 46. The bearing ring 64 is divided across and exhibits collars 66 overlapping the bearing bush 62 on both sides. Each part 64a, 64b of the bearing ring is connected to the shaft 46 by means of screws 67 so that the bearing roller 12 is guided laterally by its bearing bush 62. On both sides of the bearing seals 70 are arranged to seal off the sliding surfaces, being preferably made as lip-seals. These seals are advantageously fastened to the bearing ring 64 and overlap with their lips 72 the endfaces of the bearing bush 62 and part of the endface of the bearing roller 12. The latter includes axially projecting extensions 74 which cover over the seals to protect them.

The shaft 46 of the bearing roller 12 consists of a cylinder barrel 76 into which is welded a flat bar 78 which forms the outer parts 48 of the shaft.

This construction of the bearing rollers is extraodinarily robust and hence little prone to trouble. For maintenance and repair work such a bearing roller can also be simply replaced by raising the body be means of a hoist far enough for the outer parts 48 of the shaft 46 to be able to be lifted over the stops 54 and moved upwards out of the slots 50,52. A new bearing roller 12 can be quickly inserted in the reverse sequence. Between the exchange of the bearing rollers 12 the body may be rested with its shaft ends 14, 16 on the supporting ears 56.

FIGS. 5 to 8 show details of the construction of a body 4. Such a body includes lateral endface components 80,82 which look like a spoked wheel and include the shaft ends 14, 16 with the shaft flanges 30. The shaft ends 14, 16 are connected together by a connecting tube 84.

Between the endface components 80, 82 is arranged the stack 86 of discs 88, the individual discs being kept at pitch by spacer means 90 and connected with the endface components by means of strain members 92. In the present example the discs of the stack of discs form a helical surface i.e., one disc 88 continues without a break into the next disc. Correspondingly the endface components too are helical and exhibit a break 94 at which one disc continues into the disc of the adjoining helical surface. As may be seen in particular from FIGS. 6 and 7 the discs consist of two layers of individual sectorlike disc parts 100, the disc parts of the one layer being preferably offset with respect to the disc parts of the other layer by half the sector angle of the disc parts. This construction imparts high strength to the disc part so that rotatable bodies of considerable diameter can be produced. These sectorlike disc parts may exhibit, for example, a sector angle of 34.03° so that 10.5 disc parts are necessary for the formation of one layer of one disc of the stack of discs.

The strength of the stack 86 of discs can be improved if besides the strain members 92 further spacer members 102 are arranged which can be plugged into one another. A spacer member 102 of this kind exhibits at one side a plug-in portion 106 which is plugged into an opening 104 in a disc 88 and at the other side a cap portion 108 which grips over the plug-in portion of an adjacent spacer member. The plug-in portion 106 includes, viewed from the endface, an external face 110 tapering out, which continues into a face 112 tapering in, which leads into a recess 114 which exhibits an abutment face 116 for the disc 88. The cap portion 108 has an abutment face 118 at the end for the disc 88, which continues into an external oblique face 120 which cooperates with the tapering-in face 112 of the plug-in portion 106 of the adjacent spacer member 102 in such a way that the disc 88 is clamped in between the abutment faces 116,118 of the plug-in portion 106 and the cap portion 108.

The plug-in-together spacer member 102 is, in the present example, made as a hollow cylinder and has a slit 122 continuous along its whole length. Since it moreover consists of spring steel the spacer member is springy, so that the cap portion 108 is pulled by means of its oblique face 120 over the tapering-in face 112 of the plug-in portion 106 against the disc 88. In contrast to the embodiment illustrated it is also possible to make the space member with a slit merely in the plug-in portion so that only this portion is springy, whilst the cap portion 108 is rigid. It is also possible to produce the spacer member from plastics, which may be adequately elastic, so that complete or partial slitting may be waived. By means of these plug-in spacer members 102 the discs can also be connected and kept at pitch where no strain member 92 is provided.

By means of this method of construction it is possible to produce satisfactorily rigid rotatable bodies of large diameter, for example, of 3 to 4 metres. The bodies can be prefabricated factorywise and mounted and exchanged as a whole.

We claim:

1. A mechanico-biological waste water purifying plant of the type which includes a trough through which the waste water flows, a dip-drip body, a pair of coaxial shaft end means attached to opposite sides of said body for rotation of said body, bearing means for rotatably supporting said shaft end means which are so disposed within said trough that in use said body is partially immersed in said waste water with the axis of rotation substantially horizontal, and driving means for rotating said body, wherein said body comprises a plurality of discs spaced apart along said axis of rotation; and body interconnection means for holding each of said discs in position within said body, said body interconnection means being attached to said shaft end means; each of said discs having a plurality of substantially identical openings each in axial registration with corresponding substantially identical openings in every other one of said discs, and said body interconnection means including a plurality of plug spacers each having a spacer end larger than one of said openings, said spacer end being of such a length to closely space apart one said disc from the next of said discs, and a plug end dimensioned to fit through and extend beyond said opening, said spacer end further having a cavity to receive said plug end of another said plug spacer extended beyond another said opening, one said plug spacer extending through and beyond each said opening in each said disc into said cavity of the next said plug spacer fitted through the axially registered corresponding opening in the next said disc, whereby a sequence of said plug spacers each plugged into the next extends parallel with said axis of rotation through any one of said openings and every said corresponding opening in every said disc which is in axial registration with said one opening.

2. A purifying plant in accordance with claim 1, wherein said plug spacers are comprised of plastic material.

3. A purifying plant in accordance with claim 1, further comprising fastener means for securing each said plug spacer to said next plug spacer in each said axial sequence.

4. A purifying plant in accordance with claim 3, wherein said fastener means further comprise biasing means urging each said plug spacer into said next plug spacer in each said axial sequence.

5. A purifying plant in accordance with claim 1, wherein each of said plug spacers further comprises a circumferential internal shoulder at the axially outermost end of said cavity within said spacer end, said internal shoulder having a taper on each side with the direction of increasing internal shoulder width being radially outwards; and a circumferential external shoulder at the axially outermost end of said plug end, said external shoulder having a taper on each side with the direction of increasing external shoulder width being radially inwards, said external shoulder and said disc defining a groove extending circumferentially of said plug end, said groove being of decreasing width as it extends radially inwards; and further wherein said plug end is radially elastic and biased to expand radially, said axially outermost tapers of respectively said external shoulder and said internal shoulder cooperating to facilitate entry of said plug end of a first of said plug spacers into said cavity of a second of said plug spacers, said axially innermost tapers of respectively said external shoulders and said internal shoulders cooperating after said first plug spacer has been plugged into said second plug spacer to urge said plug spacers together, whereby said disc through the opening of which said first plug spacer is fitted is firmly clamped between said first and second plug spacers.

6. A purifying plant in accordance with claim 5, wherein said spacer end is radially elastic and biased to contract radially.

7. A purifying plant in accordance with claim 6, wherein each of said plug spacers further comprises a first flat circumferential abutment face upon said spacer end at the axial location at which said spacer end joins said plug end, and a second flat circumferential abutment face next radially outwards of said outermost taper of said internal shoulder, the respective planes of said first and said second faces each lying perpendicular to said axial direction.

8. A purifying plant in accordance with claim 7, wherein each of said plug spacers is substantially rotationally symmetrical about a line in the axial direction.

9. A purifying plant in accordance with claim 8, wherein each of said plug spacers is substantially hollow.

10. A purifying plant in accordance with claim 9, wherein each of said plug spacers is comprised of sheet metal.

11. A purifying plant in accordance with claim 10, wherein each of said plug spacers is comprised of spring steel.

12. A purifying plant in accordance with claim 11, wherein each of said plug spacers has a slit lying substantially in a single plane in common with and only on a single side of said line of rotational symmetry.

13. A purifying plant in accordance with claim 1, wherein each of said discs further comprises a plurality of sector-like disc parts of sheet form and having a sector angle, said plurality of parts being arranged in two layers, each layer comprised of said disc parts in abutting relation so that the surface of each disc part continues without a step into the corresponding surface of the next abutting disc part, said two layers being in surface to surface contact with each other and being angularly offset by a fraction of said sector angle.

14. A mechanico-biological waste water purifying plant of the type which includes a trough through which the waste water flows, a dip-drip body, a pair of coaxial shaft end means attached to opposite sides of said body for rotation of said body, bearing means for rotatably supporting said shaft end means which are so disposed within said trough that in use said body is partially immersed in said waste water with the axis of rotation substantially horizontal, and driving means for rotating said body, wherein said body comprises a plurality of discs spaced apart along said axis of rotation; and body interconnection means for holding each of said discs in position within said body, said body interconnection means being attached to said shaft end means; and each said shaft end means is supported by one of said bearing means, said one bearing means comprising a pair of bearing roller assemblies, a bearing housing, and a bearing pedestal, said roller assemblies being removably mounted in said housing and each disposed parallel to said axis of rotation of said body, said roller assemblies being spaced respectively fore and aft and equidistant from a vertical plane through said axis, and side-by-side one another and below said shaft end means to thereby support said shaft end means, and said housing being fixedly held upon said pedestal, each of said roller assemblies comprising a substantially cylindrical roller, two outer shaft parts extending coaxially of said roller and at each end thereof, and mounting means for rotatably mounting each of said shaft parts to said roller, said housing comprising two plates normal to said axis and axially to the left and right of said rollers, each of said plates having two open ended slots, each of said slots having an upper and a lower side and an inner end, each said slot being dimensioned to receive one of said outer shaft parts, each said slot being in the shape of an offset passage with a shoulder therein and extending beyond said plate to the outside with said shoulder defining a stop on its lower side, so that said shaft part upon removal must be lifted over said stop, each said lower side being inclined more steeply than a plane normal to a line perpendicular to and connecting said axis of rotation of said body with the rotational center line of the roller assembly corresponding to said slot, whereby the support provided said body will urge said shaft part downwards against said inner end.

15. A purifying plant in accordance with claim 14, wherein said inclination of each said lower side is substantially 45° from the horizontal.

16. A purifying plant in accordance with claim 14, wherein each said outer shaft part has a flat sided rectangular cross-section and said flat side rests on said lower side of said receiving slot.

17. A purifying plant in accordance with claim 14, wherein there are two said dip-drip bodies disposed adjacent to one another along a common axis of rotation and wherein said bearing means commonly supports the two adjacent shaft end means.

18. A purifying plant in accordance with claim 14, wherein each said shaft end means comprises a cylindrical extension member and a flange assembly, said flange assembly including a flange having a cylindrical outer rim peripheral bearing surface larger than said extension member, said flange being attached to said extension member at its axially outermost end coaxial both with said extension member and said axis of rotation and perpendicular to said axis.

19. A purifying plant in accordance with claim 18, wherein each said roller has a wide circumferential groove for receiving said flange.

20. A purifying plant in accordance with claim 18, wherein there are two said dip-drip bodies disposed adjacent to one another along a common axis of rotation, and wherein said bearing means commonly supports the two adjacent shaft end means flanges.

21. A purifying plant in accordance with claim 20, wherein each of said adjacent flange assemblies further comprises a driving pin mounted on said flange and offset from said axis and projecting axially outward therefrom and has a driving opening located and dimensioned to receive the driving pin mounted on the other said adjacent flange, whereby said adjacent flanges are connected to rotate together.

22. A purifying plant in accordance with claim 21, wherein each said driving pin comprises a bolt and a bolt bush, said bolt bush being mounted on said bolt and said bolt being mounted on said flange.

23. A purifying plant in accordance with claim 14, wherein said housing further comprises two rectangular guide bars and arms extending upwards fore and aft on each said plate, said arms joined to and supporting said guide bars, each of said guide bars disposed extending from one said plate to the other said plate parallel with said body axis of rotation, said guide bars being at the level of said body axis of rotation and closely spaced apart respectively fore and aft from said shaft end means, said housing being open upwardly for vertical introduction of said shaft end means to said supporting bearing rollers, whereby said guide bars will facilitate placement of said dip-drip body with said shaft end means supported upon said bearing rollers and will restrain said shaft end means from jumping out of place during rotation.

24. A purifying plant in accordance with claim 23, wherein each of said housing plates further comprises two ears extending upwards below said shaft end means, said ears spaced respectively fore and aft and equidistant from a vertical plane through said axis, said ears proximate but spaced apart from said shaft end means, whereby said shaft end means may be supported without rotation upon said ears when said rollers have been demounted and removed.

25. A purifying plant in accordance with claim 14, wherein each of said rollers is annular and comprises an outer substantially cylindrical piece and an inner hollow-cylinder bearing bush within said outer piece, and wherein said mounting means comprises a bearing ring and a cylindrical barrel, said bearing ring being fitted around and connected to said barrel, said bearing ring being mounted in sliding rotation relation within said bearing bush, and said two outer shaft parts being fastened to said barrel and extending coaxially at each end of said barrel.

26. A purifying plant in accordance with claim 25, wherein each said annular roller further comprises a flat endface on each side lying normal to said rotational center line and extending over said bearing bush and a substantial portion of said outer piece, and each of said seal means is fastened to said bearing ring and overlaps one of said flat endfaces radially across said bearing bush and a portion of said outer piece.

27. A purifying plant in accordance with claim 26, wherein each said outer piece further comprises an axially projecting rim extension which bounds said endface radially outward on each side of said annular roller, whereby said seal means are radially covered.

* * * * *